United States Patent
Currivan

[11] Patent Number: 5,970,092
[45] Date of Patent: Oct. 19, 1999

[54] ADAPTIVELY EQUALIZED BURST RECEIVER AND METHOD FOR UPSTREAM BROADBAND DATA

[75] Inventor: Bruce Currivan, Los Altos, Calif.

[73] Assignee: Stanford Telecommunications, Inc., Sunnyvale, Calif.

[21] Appl. No.: 08/898,849

[22] Filed: Jul. 25, 1997

[51] Int. Cl.$^6$ .................................................. H03H 7/30
[52] U.S. Cl. .............................................. 375/232; 375/324
[58] Field of Search ........................ 375/229, 232, 375/324, 340; 364/724.2; 333/28 R

[56] References Cited

U.S. PATENT DOCUMENTS 5,572,547  11/1996  Citta et al. ............................... 375/232
5,710,792   1/1998  Fukawa et al. .......................... 375/229
5,717,717   2/1998  Yang et al. .............................. 375/232

*Primary Examiner*—Temesghen Ghebretinsae
*Attorney, Agent, or Firm*—Jim Zegeer

[57] ABSTRACT

A digital mode receiver for the reception of signals from multiple independent subscribers, as on a cable television bidirection broadband data transmission system, adapted for subscriber inquiries and two-way data transmission. Each burst comprises a fixed preamble portion and a variable data portion. The received burst is sampled and fed to a sample storage buffer. The preamble portion's output is used to initialize an equalizer, and to synchronize carrier and modulation clock. By repeating the processing of the preamble and optionally all or part of each burst, accuracy of detection of the variable data is improved, so that it is feasible to receive individual bursts without burst-to-burst coordination, while using a short preamble for increased efficiency.

14 Claims, 2 Drawing Sheets

Note:
P = Preamble
D = Data

ADAPTIVELY EQUALIZED BURST RECEIVER AND METHOD FOR UPSTREAM BROADBAND DATA

BACKGROUND AND BRIEF DESCRIPTION OF THE INVENTION

Modern broadband communications, such as hybrid fiber/coax (HFC), cable television (CATV), local multipoint distribution system (LMDS) and multiple multipoint distribution system (MMDS) requires high bandwidth not only in the downstream direction (from the headend to subscribers), but also in the upstream or return path direction (from each subscriber to the headend), as depicted in FIG. 1. The communication involved is digital in nature, though digital data involved may represent either analog or digital data, at its source.

Communication in the return path (upstream) for many of these systems is shared between many subscribers using time division multiple access (TDMA) communication, which involves transmission of data in discrete bursts as shown in FIG. 2. The headend receiver must therefore synchronize to short bursts (often as short as 8–64 bytes of eight bits each). In the sequence of bursts, consecutive bursts may be transmitted by different subscriber transmitters, each with a different, and time-varying, channel frequency response, as shown in FIG. 3. The high bandwidth requirements, together with channel artifacts including echoes, microreflections, multipath effects or other such impairments, lead to a need to adaptively equalize the received burst signals to mitigate intersymbol interference and/or fading.

Some modulation techniques, such as Quadrature Phase Shift Keying (QPSK), may require equalization only if symbol rates are high (above approximately 1,000,000 symbols/second), whereas higher order modulation, such as 16 QAM, may require equalization at even lower symbol rates to achieve near-optimal performance. In addition, in some systems narrow band interference is a major factor. Adaptive equalization has the added capability of removing, or at least attenuating, narrow band interferers.

Given these advantages of adaptive equalization, techniques are presented herein to implement the adaptive equalizer in a burst transmission environment. The following paragraphs describe specific techniques to process burst signals.

One of the challenges of burst transmission is how to quickly initialize the adaptive equalizer taps. In normal, continuous transmission systems, from one hundred to ten thousand symbols are used to train the equalizer. Other implementation of burst adaptive equalizers rely on long preambles (for example, 32 to 256 symbols) to adapt the equalizer. Still others require that equalizer coefficients be stored for each user and recalled before receiving a burst from a given user. The present invention accomplishes equalizer training using a short preamble, which may be as short as 16 symbols or less, and may be used with or without equalizer coefficient storage and recall.

According to the invention a digital burst mode receiver is provided for the reception of signals from multiple independent subscribers, as on an interactive cable television system adapted for subscriber inquiries and 2-way data transmission. Each burst comprises a preamble portion and a data portion. The received burst is sampled and fed to a sample storage buffer memory. The preamble portion's output is used to initialize an adaptive equalizer and to synchronize carrier and modulation clock. By repeating the processing of the preamble portion and optionally all or a portion of the data portion of each burst, accuracy of detection of the variable data is improved, so that it is feasible to receive individual bursts without burst-to-burst coordination and with greater efficiency resulting from shorter preambles.

One example of a communication system to which this invention is applicable is that described in U.S. Pat. No. 5,553,064, High Speed Bidirectional Digital Cable Transmission Systems, issued Sep. 3, 1996. This invention is an improvement upon and functionally extends the invention described in a pending application Burst Demodulator for use in High Speed Bidirectional Cable Transmission Systems (Krasner, Edwards, Xenakis and Currivan), of which the present applicant is a co-inventor.

DESCRIPTION OF THE DRAWINGS

The above and other objects, advantages and features of the invention will become more apparent when considered with the following specification and accompanying drawings, wherein.

DETAILED DESCRIPTION OF THE INVENTION

Figure 1:
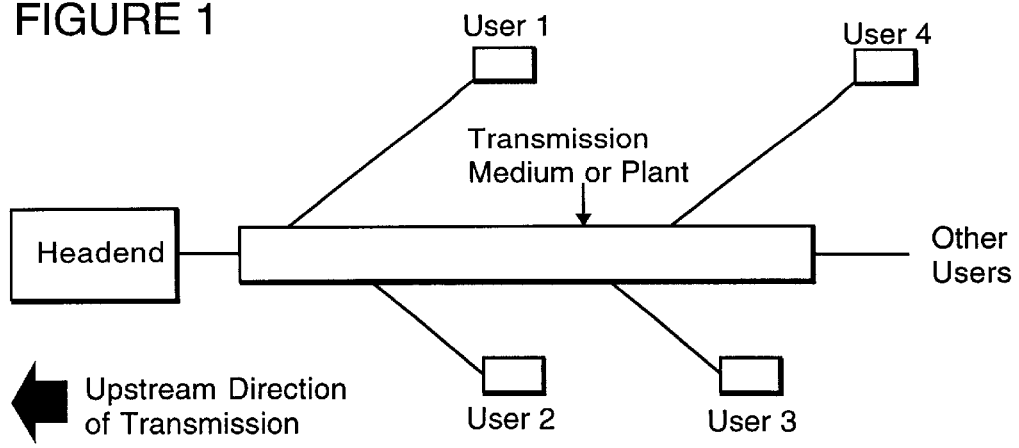
FIG. 1 is a block diagram of a broadband communications system incorporating the invention, FIG. 2 diagrammatically illustrates a Time Division Multiple Access (TMDA) signal burst structure, FIG. 3 diagrammatically illustrates time varying upstream channels which are generally different from each other.
Figure 2:
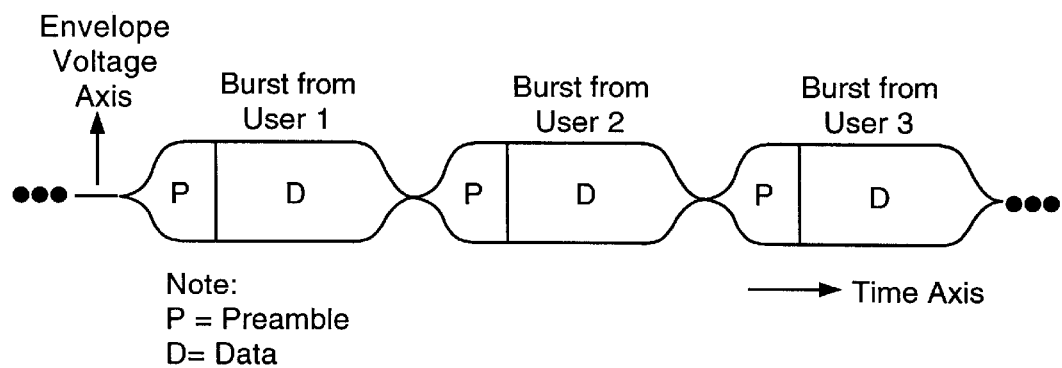
Figure 3:
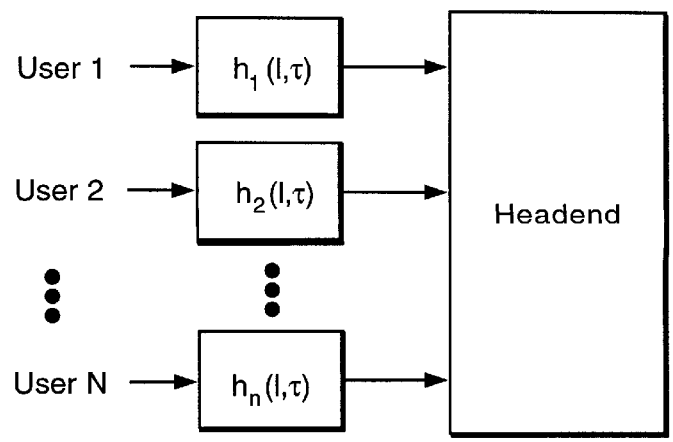
Figure 4:
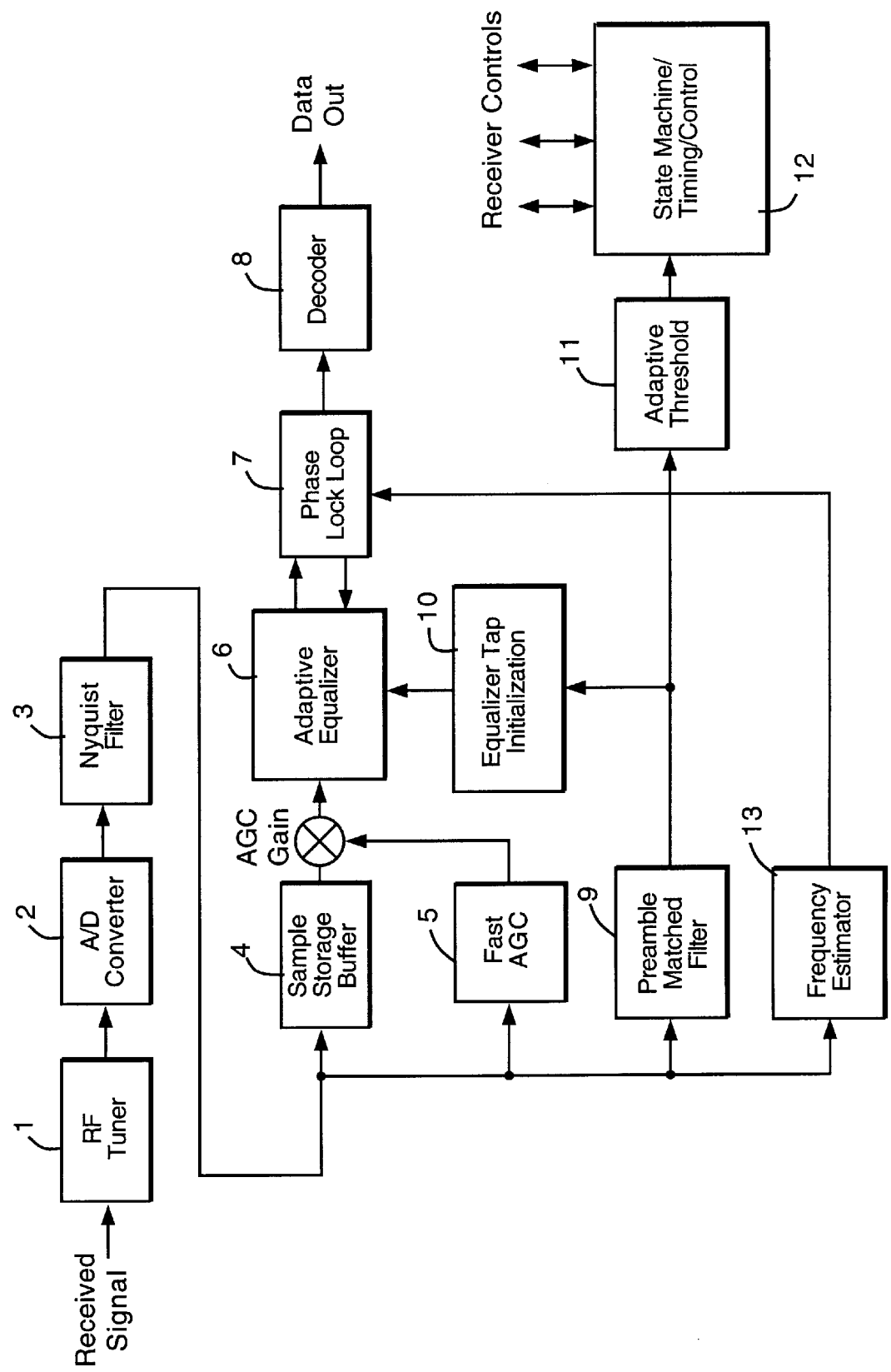
FIG. 4 is a block diagram of a burst receiver incorporating the invention.

FIG. 4 illustrates one form of the burst receiver of the present invention. The received signal enters at the upper left of the diagram, and the desired channel is selected in the RF tuner 1. The output of the tuner, which may involve frequency shift using conventional techniques, constitutes separate but complementary in-phase (I) and quadrature (Q) signals. (The single lines connecting circuit elements in FIG. 4 each denote one or more paralleled connections.) An analog to digital converter 2 samples these signals and produces digital samples for further processing. In an alternate approach, a single A/D converter is used, and separation into I and Q occurs digitally. A Nyquist filter 3 is matched to the elemental pulse shape of the symbol pulses, which may be of square-root raised-cosine form. This signal then enters a sample storage buffer digital memory 4, whose purpose is to store and thereby to permit processing the same signal samples several times. A digital gain control 5 maintains signal level approximately uniform for bursts from all subscribers and compensates for any signal fading. An adaptive equalizer 6 filters the signal to remove channel signal distortion and intersymbol interference. A phase-locked loop (PLL) 7 operates in conjunction with the adaptive equalizer to remove phase and frequency offsets. A decoder 8 processes the data for output.

Using as inputs the same inputs as the FIFO memory are several other parts of the receiver: a fast automatic gain control (AGC) (5) measures the signal level and supplies a gain value to the automatic gain control (AGC); a preamble matched filter (PMF) 9 is matched to the fixed binary sequence (preamble) which is transmitted at the start of every burst. The PMF output is used by an Equalizer Tap Initialization element 10 to initialize the adaptive equalizer taps; this output also passes to an adaptive threshold element 11, whose output drives burst-detection logic in a state machine timing controller 12 which controls the disposition of the data received; finally, the PMF input is also used by the Frequency Estimator 13 to measure carrier frequency offset and provide inputs to the PLL for removing effects of carrier shift from the data.

Choice of Preamble Sequence and Modulation Method

A particular preamble sequence for synchronization is described and claimed in the patent application (Krasner, Edwards, Xenakis, and Currivan) cited earlier. The present invention utilizes in its preferred embodiment a pseudo-random sequence, which is superior to the aforementioned sequence since it is less likely to be mis-synchronized. (A pseudo-random sequence is one whose autocorrelation function has a narrow single peak and minimal side-lobes). An example is the 16-symbol Neuman-Hofman sequence 0000111011101101 which has the following desirable properties:

Short duration to minimize overhead. This preamble length (8–16 symbols) is often used even if adaptive equalization is not needed.

Good autocorrelation properties: maximum sidelobe=⅛ of main lobe.

Good frequency spectrum: broadband so as to equalize all frequencies across the signal band.

Reduced constellation: BPSK (that is, the use of binary values) reduces complexity of required matched filter as compared to QPSK, 16 QAM, or other modulation used in the preamble. If greater matched filter complexity is permitted, other sequences, such as Frank sequences, with more complex constellations than BPSK may be used. These more general sequences can have even better autocorrelation properties; however, they do not lend themselves to as good performance using differential demodulation techniques, which may be used, as described below, to reject noise.

Applies as binary (BPSK) modulation, this has the following desirable properties. For the number of symbols included (16), it has:

(a) An autocorrelation function whose maximum sidelobe is only ⅛ of its main-lobe peak.

(b) Broadband frequency spectrum, including all frequencies across the signal band.

(c) Use of binary modulation for the preamble reduces the complexity of the required matched filter, as compared to QPSK, 16 QAM, or other modulation that could be used for the preamble. If greater matched filter complexity is available, other sequences, such as Frank sequences, with more complex modulation that BPSK may be used. Though more general sequences can have even better autocorrelation properties, they do not lend themselves to as good performance using differential demodulation techniques which may be used, as described later, to reject noise.

Techniques to use the burst preamble to reliably detect the presence of each burst, estimate timing synchronization and carrier frequency synchronization are described in the Krasner et al application and incorporated here by reference.

Use of the Preamble Matched Filter to Initialize the Adaptive Equalizer Taps on Each Burst When the received signal containing the preamble passes through the PMF, the time sequence of the PMF output (hereinafter referred to as the channel sample sequence) is equal to the convolution of the impulse response of the transmission channel with the autocorrelation function of the preamble. Since the preamble is selected to have an autocorrelation function which is narrow and with low sidelobes, the channel sample sequence is approximately equal to the channel impulse response. This channel sample sequence, which in a base band implementation is a sequence of pairs of numbers (in-phase and quadrature components), may readily be processed and used to initialize the adaptive equalizer taps. We will describe several alternatives for the handling of the channel sample sequence which differ in both cost and effectiveness.

Simple alternative: the peak (largest magnitude) sample of the estimated channel impulse response sequence is loaded into the main feed-forward equalizer tap. This results in the adaptive equalizer being initialized with its dominant tap close to its correct value. The remaining equalizer taps require adaptation to achieve their correct values.

Second alternative: the channel sample sequence values are loaded directly (respecting the need to reverse time-order) into the respective equalizer taps. This results in the adaptive equalizer being initialized as an estimate of the matched filter (that is, matched to the transmission channel impulse response). At low signal to noise rations, this is a very good approximation to the ideal least-mean-squared filter (Wiener filter). This alternative is also simple, since it requires no processing of the channel sample sequence other than time reversal. In many cases this will be adequate to get the equalizer under way for data equalization.

More complex alternatives, including estimation and inversion of the autocorrelation matrix, may be used to process the channel sample sequence, to develop a more accurate initial setting for the equalizer taps. These alternatives require more complex logic currently less amenable to implementation in high-speed logic circuits, and will not be further described here.

Application of Preamble Matched Filter Output to Carrier Phase Locking

Another challenge in burst transmission is how to quickly initialize the phase-tracking loop. In the technique described above, the adaptive equalizer tap weights are initialized in phase (as well as in magnitude). This has the effect of removing the initial phase offset at the output of the adaptive equalizer. The phase tracking loop, which follows the adaptive equalizer filter, thus has a very small initial phase offset and can acquire rapidly.

Sample Storage Buffer Memory

The signal samples are stored in the order received in a sample storage buffer, which may consist of a first in, first out (FIFO) memory. A dual-port RAM may be used for this function. The samples may then be read from the buffer several times for reprocessing. The beginning of the burst may be read out and processed several times in order to estimate the signal parameters and adapt the equalizer, and process the data portion of the burst.

Fast Automatic Gain Control

Another challenge of receiving burst transmissions is to quickly establish the proper signal gain. Fast Automatic Gain Control (AGC) is important to assure proper equalizer performance. In the commonly used LMS (Least Mean Square) algorithm, for example, the gain of the weight adaptation loop is proportional to the square of the input signal amplitude. If signal gain is not set properly, the equalizer can become unstable. In this invention, the method for fast AGC is as follows: (1) measure signal power during the preamble, using the matched filter and state machine detection logic to determine the timing of the received preamble samples; (2) compare measured power to the desired signal power and compute the gain value required to give the desired signal power; (3) multiply the signal samples at the FIFO output by the required gain value. Note that this method takes advantage of the fact that the signal samples are stored in the FIFO memory where they can be reprocessed.

Determining Frequency of a Burst

Yet another challenge of burst transmission is to quickly determine frequency, since each subscriber produces its own carrier frequency. Once determined, the frequency may be used to correct the frequency of the current burst (as an aid to the phase lock loop), and is also available as an output to other circuits that can make use of knowledge of the frequency offset. In this invention, fast frequency estimation using preamble samples is carried out as follows:

(1) Identify the received signal samples corresponding to the preamble, using the matched filter and state machine detection logic to determine the timing of the received preamble symbols.

(2) Remove the preamble modulation by multiplying the received preamble sample data by the complex conjugate of the (known) preamble data. The result will have in-phase and quadrature components that are sinusoidal (plus noise that is present). The frequency of the sine wave equals the frequency offset of the received signal, and the sign of the offset can be determined from the phase relationship of its in-phase and quadrature components.

(3) Process these samples using any standard frequency measurement technique applicable to a sine wave. A suggested technique for the measurement of the frequency of a sine wave is the following: Compute the phase of each sample. Unwrap the phase (unwrapping consists of removing any jumps of magnitude greater than 180 degrees). Subtract initial phase from final phase, and normalize (using the sample rate) to give units of frequency. A popular technique for frequency estimation has been described by S. Kay "A Fast and Accurate Single Frequency Estimator" IEEE Transactions on Acoustics, Speech, and Signal Processing", Vol. 37, No. 12, December, 1989. More elaborate paradigms are well known in the art.

An alternate method for fast frequency estimation using signal samples is as follows: First the Transmitter sends a special burst whose modulation is a continuous wave (CW), binary phase shift keying (BPSK), or quaternary phase shift keying (QPSK). Second the receiver identifies the received signal samples corresponding to the burst, including the preamble and data samples, using the matched filter and state machine detection logic to detect the burst as described above and to determine the timing of the received signal symbols. Next, the receiver removes the data modulation from the received preamble samples by raising the signal samples to the Mth power, where M=1 for CW, M=2 for BPSK, and M=3 for QPSK signals. This leaves a pure sine wave (plus noise), whose frequency represents M times the frequency offset of the received signal. Next, the receiver processes these samples using any standard frequency measurement technique applicable to a sine wave. Finally, divide the frequency measurement by M to correct for the prior multiplication by M.

Refining Setting of the Adaptive Equalizer Taps

After the equalizer is initialized using the channel sample sequence out of the preamble matched filter, it may be trained further using the LMS algorithm or other standard algorithm. Clearly, short burst transmissions do not provide a long training sequence. The technique used here is to reuse the received preamble. That is, received signal samples can be delayed using a FIFO or, if available, a suitably fast random access memory. After the adaptive equalizer tap values are set using the channel sample sequence, the received signal samples corresponding to the preamble are read out of the delay element and, this time, passed through the adaptive equalizer. The equalizer may then be trained on the preamble using the LMS algorithm or other standard algorithm. This technique results in further refinement of the initialization of the adaptive equalizer taps.

In systems where the carrier offset is small, the decision direction algorithm operates without aiding from a carrier loop. In systems where the carrier offset is large, the decision direction algorithm requires aiding from the carrier loop, which must be locked before decision direction commences.

Using the Data Following the Preamble to Further Train the Adaptive Equalizer Taps for Each Burst After the equalizer is initialized and (optionally) trained using the preamble, the settings on its taps will have converged to the degree that correct decisions may be made a large percentage of the time. This may be adequate for many applications, without further refinement of tap weights. However, further training may be necessary in some cases, for example: (a) if many taps are used in the equalizer, (b) using particularly difficult channels, or (c) if interference is present. In this case the equalizer training may be continued into the random data portion of the burst, using the standard technique known as decision directed mode. This involves use of the actual symbol value nearest to the estimated symbol value as a reference for computing adaptation error on each symbol. As long as the symbol error rate is low, decisions are correct most of the time, and training on data decisions performs nearly as well as training using a special training sequence.

Decision direction is a standard technique whereby preliminary decisions are made on each symbol at the output of the adaptive equalizer and these decision are used to aid the continued adaptation of the equalizer. (The preliminary decisions may be reversed later if more information is available, as, for example, if a subsequent error correction decoding is performed.) In most cases the decision is simply the nearest constellation point. Its adaptation to burst signal processing in this invention involves the following novel implementation. A delay element (such as the sample storage buffer shown in FIG. 4) is used so that part of the data (for example, the first N=64 symbols) is processed through the adaptive equalizer two (or more) times. On the first pass, after the equalizer taps are trained using the preamble, training continues into the data portion of the burst, using the data decisions on the first N symbols. This increases the effective length of the preamble by adding N. On the second pass, the entire data burst, beginning with the first symbol, is passed through the (previously trained) equalizer and the data is demodulated and output to the user. The equalizer taps may be held constant after the end of the first pass, but in most applications the taps are allowed to continue adapting based on decisions during the second pass for further refinement.

As an example, assume that bursts are of length 128 data symbols plus a 16-symbol preamble, and that the following processing is done on each burst: (a) process the preamble two times, (b) process the first 64 data symbols once, and (c) process the entire burst (including preamble and first 64 data symbols) again for demodulation of the data. Then the effective number of training symbols is 16×2+64+16=112 symbols, although the actual number of training symbols is only 16. The effective number of preamble symbols is thus increased by factor of 112/16=7 in this example.

This technique permits the (usually fixed-value) training sequence to be kept short, since data after the training sequence serves as an extension of the training sequence. Thus the overhead in channel time represented by the training sequence is kept small, increasing burst communications efficiency, while the adaptation performance is improved.

Another novel method is to vary the adaptation gain in each pass to refine the performance. For example, the first pass may use higher gain for fast acquisition. The second pass may use lower gain for better noise smoothing.

Multiple Processing Chains Used for Closely Spaced Bursts

When bursts are closely spaced, it may be necessary to begin storing and processing the next-following burst though processing of its predecessor is not yet complete. This can be accomplished by replicating a portion of the demodulation circuitry two or more times. As an example, two banks of identical demodulation circuits, which we will refer to as Bank A and Bank B, are used alternatively. Before Bank A is finished demodulating the current burst #1, a new burst #2 may arrive. If so, while Bank A continues demodulating burst #1, Bank B begins to adapt to and process burst #2. Then when Bank A finishes processing burst #1, it is prepared to adapt to and process burst #3 when it arrives. The process continues in a like manner, alternating successive bursts between banks A and B. This example provides burst processing time which is twice the burst interval. Additional banks can be added if longer burst processing is required.

Faster-than-real-time Processing

Another approach to permitting multi-pass processing of preamble and data samples is to cycle the data samples through the processing train faster than they arrived in real time. After the input data has been converted to sampled digital values, processing may be carried out at any rate that is feasible via available digital logic. Therefore, it is not necessary to use a multiplicity of processing chains as suggested above. However, since the final data samples cannot begin to be processed until the end of the burst, there must remain sufficient time between the end of one burst and the start of the next burst to complete processing of the final data in each burst. In any event, the single processing chain must have the capacity to perform all of the processing required for each burst within one burst interval, for otherwise it would not receive continuously. However, if the processing of different bursts required different numbers of passes of the preamble or of the complete burst, based on error level measured during the process, processing of certain bursts might require longer than one burst interval so long as the total processing time did not exceed real time. In this case, the FIFO or other memory would need sufficient capacity to store all of the bursts that might be undergoing processing concurrently.

Use of Different Types of Processing Chains to Process Signals Having Different Modulations This technique consists of replicating a portion of the demodulation circuitry two or more times, each portion being optimized for a different signal format. As an example, two banks of demodulation circuits might be used in the receiver, Bank A being used to demodulate bursts requiring adaptive equalization, such as 16 QAM data bursts, and Bank B being used to demodulate bursts not requiring adaptive equalization, such as QPSK control "mini-slots" which have been proposed for use in IEEE 802.14 systems. The delay during processing by the hardware in Bank B should be kept to a minimum so that short bursts (for example, 8 bytes) can be processed rapidly. That of the hardware in Bank A could be greater, so that longer bursts (for example, 64 bytes and greater) could be processed with adaptive equalization using more than one pass, as described earlier.

Tracking Carrier Phase on Each Burst

Carrier phase may be tracked by any of several well known techniques:
  (a) Use of a decision-directed Phase-Locked Loop which removes carrier-phase shift at the equalizer output and introduces the phase change into its error signal, thereby removing phase shift and frequency offset in the phase-locked loop.
  (b) Allowing the sequence of signals on the adaptive equalizer taps to shift as an intrinsic part of the adaptation algorithm, thereby removing phase shift and frequency offset in the equalizer.

In systems having small carrier frequency offset, carrier phase may be tracked by the following novel technique:
  (c) The use of a block phase estimator (such as the STel 2211 chip, applicable to BPSK or QPSK) following the adaptive equalizer. In this case, the equalizer tap values are fixed after the first pass, carrier offset appears in the output of the equalizer, and is subsequently removed by the block phase 35 estimator.

Tracking Clock Phase on Each Burst

Clock phase may be tracked by any of the following well-known techniques:
  (a) addition of a symbol tracking loop preceding the adaptive equalizer. With this addition, a T-spaced adaptive equalizer (one operating with sample rate equal to the symbol rate) may in some cases be used.
  (b) use of an adaptive equalizer operating at a fraction T/N of the symbol interval T (e.g., T/2-spaced). This type of equalizer tracks symbol phase by adjusting its tap weights. In a system operating with long bursts, a coarse symbol-tracking loop may still be needed, ahead of the adaptive equalizer, to track symbol-frequency offsets.

While preferred embodiments of the invention have been described and illustrated, it will be appreciated that various adaptations, modifications and refinements to the invention will be readily apparent to those skilled in the art.

What is claimed is:

1. An adaptively equalized receiver for multisource digital burst inputs, each digital burst having a fixed initial sequence (preamble) and variable data comprising:
  means for producing baseband signals, which take the form of separate series of in-phase and quadrature signal digital sample values, a digital memory adapted to store those digital sample values and read-out selected portions of said digital sample values at a later time but in the same sequence in which they arrived, a digital adaptive equalizer, and digital circuits that compare a predetermined initial signal sequence used at the start of each transmitted burst with a received signal and alter tap values of the equalizer, such that the variable data-containing portion of each burst is interpreted correctly in the presence of communications channel distortion, noise, and interfering signals.

2. A receiver as described in claim 1, including a preamble matched filter to said fixed initial sequence (preamble) whose output is used to establish carrier signal phase at the beginning of the variable data.

3. A receiver as described in claim 2 said receiver having a gain control in which the magnitude of the signal during said preamble is used to set said gain control to maintain the magnitude of the data samples within a preselected range of values.

4. A receiver as described in claim 3 in which the output of said preamble matched filter is used to synchronize to the clock which determines changes in signal state.

5. A demodulator for sampled digitalized received burst signals each of which consists of a fixed programmable preamble portion followed by a variable data portion, comprising:

a sample storage buffer for storing the sampled digital input signals comprising at least the time interval of the preamble portion of a received burst, and a processing chain comprising:

a digital adaptive equalizer receiving the burst from the output of the sample storage buffer, a digital filter whose response is matched to the pattern of the fixed preamble portion of a burst and whose output is in the form of tap values for at least some of the taps of the adaptive equalizer.

6. A demodulator as in claim 5 wherein the sample storage buffer is read out from the beginning of the burst more than one time, with the estimates made by subsequent re-processing of the sampled data being used to refine equalizer settings used during the earlier processing of the data.

7. A demodulator as in claim 6 wherein the number of times preamble data is processed is greater than the number of times the data portion of the bursts is processed.

8. A demodulator as in claim 5, for which the preamble sequence is a pseudo-random sequence selected for broad and near-uniform frequency spectrum representative of that of random data.

9. A demodulator as in claim 5 containing a multiplicity N of similar processing chains, wherein each such chain processes one burst, while the next following burst is processed by another chain, until the first chain has finished processing whereupon the first chain processes the next burst.

10. A demodulator as in claim 5 containing a plurality of processing chains, each chain designed to process digital signals of a particular modulation type and rate, such that signals from different sources having different modulation types and rates can be correctly received in the single receiver.

11. A demodulator as in claim 5 wherein each modulation symbol employed in the fixed preamble represents fewer states than does a symbol in the variable data following, thereby to train the equalizer on data that can more reliably be identified under adverse channel conditions.

12. A digital circuit for demodulation of individual digital burst signals each of which contains a known preamble symbol pattern, comprising:

analog-to-digital conversion means,

Nyquist filtering means matched to individual pulse shape memory means for storing the samples representing a burst of digital symbols and for outputting selected portions of them afterward one or more times in whole or part, in the same sequence as received, adaptive equalizer means for conditioning the series of samples from the output of the memory means based on values entered into one or more taps, fast AGC means whereby the output samples from the memory can be multiplied by a factor derived from the preamble pulses as the output samples are used, preamble matched filter means whereby the pulse response of the transmission channel through which the burst was received is derived from the known preamble symbol pattern, and whose outputs supply settings for the taps of the adaptive equalizer, frequency estimator means whereby offset in the carrier frequency of a received signal is measured, a phase locked loop receiving error signals from the frequency estimator and acting to remove the effects of frequency shifts in the adaptively equalized burst, and decoder means to convert the samples comprising a burst into digital output data.

13. In an adaptively equalized receiver for multisource digital burst inputs comprising means for producing baseband signals from a received signal, which after processing, take the form of separate series of in-phase and quadrature signal digital sample values, the improvement comprising:

a digital memory connected to store said digital sample values and of reading out selected portions of said digital sample values at a later time but in the same sequence in which they arrive, a digital adaptive equalizer, and digital circuit means for comparing a predetermined signal sequence used at the start of each transmitted burst with a received signal and alter tap values of the equalizer, whereby the data-containing portion of each burst is interpreted correctly in the presence of communications channel distortion, noise, and interfering signals.

14. In a method of operating a digital burst mode adaptively equalized receiver for the reception of signals from multiple independent subscriber transmissions wherein each burst comprises a fixed or programmable preamble portion and a variable data portion, the improvement wherein each received burst is sampled and fed to a sample storage buffer, using the preamble portion's output to initialize an adaptive equalizer and to synchronize carrier and modulation clock, and repeating the processing of the preamble portion and selectively all or a portion of each variable data portion to enhance detection of said variable data so as to receive individual bursts without requiring burst-to-burst coordination.

* * * * *